United States Patent [19]

Gentry

[11] Patent Number: 4,817,405
[45] Date of Patent: Apr. 4, 1989

[54] AUTOMOTIVE TRANSMISSION LOCK

[76] Inventor: Edward Gentry, RR #1 Box 195, Westbend, Iowa 50597

[21] Appl. No.: 65,599

[22] Filed: Jun. 23, 1987

[51] Int. Cl.⁴ ............................................. E05B 65/12
[52] U.S. Cl. ........................................ 70/247; 70/202
[58] Field of Search ............... 70/192, 193, 194, 202, 70/203, 211, 247, 248; 74/475, 473 R, 526–527, 532

[56] References Cited

U.S. PATENT DOCUMENTS

| | | | |
|---|---|---|---|
| 2,293,197 | 8/1942 | Dorr | 70/202 |
| 3,810,369 | 5/1974 | Giovanniello | 70/247 |
| 4,077,276 | 3/1978 | Knox | 70/203 |
| 4,282,769 | 8/1981 | Sendrock | 70/247 |

Primary Examiner—Robert L. Wolfe
Attorney, Agent, or Firm—Kent A. Herink

[57] ABSTRACT

A transmission lock for locking column-operated automatic transmission of a running motor vehicle. A lock cylinder operable only by a mating key includes a radially extended ear. The automatic transmission is provided with a collar or ring that includes a portion engageable by the extended ear of the lock cylinder. When in a locked position, the extended ear prevents movement of the automatic transmission by engagement with the collar or ring. Pivotal movement of the cylinder by the mating key to a free position disengages the extended ear and permits free operation of the transmission. A second embodiment locks console-operated automatic transmissions.

2 Claims, 1 Drawing Sheet

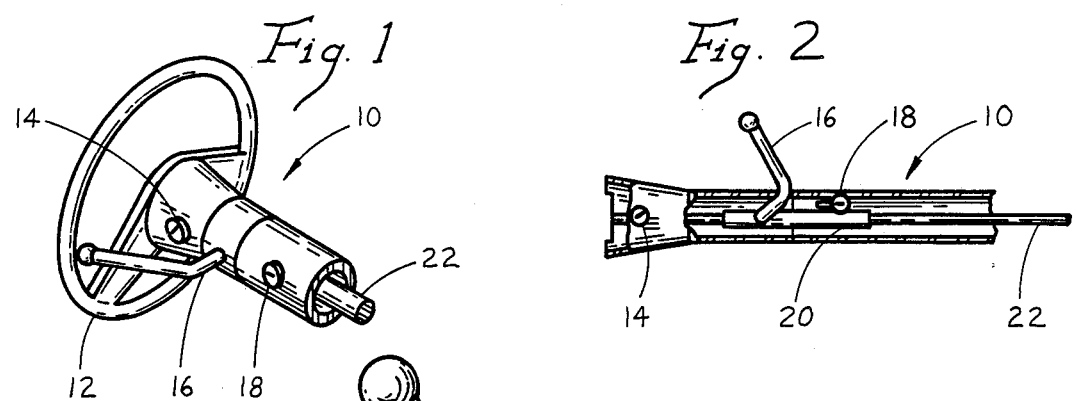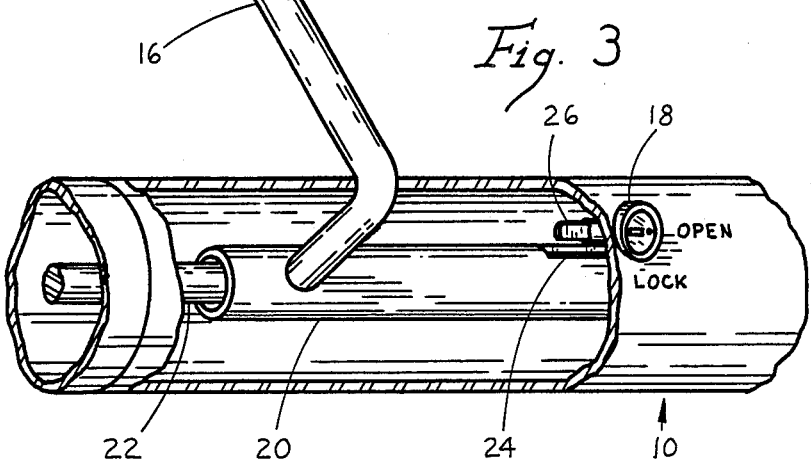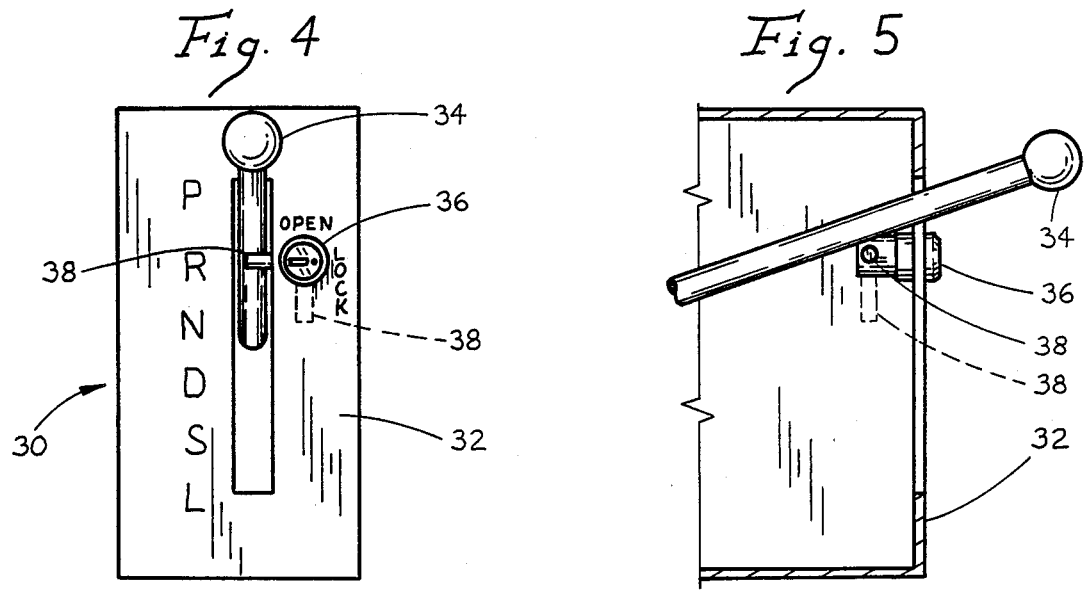

AUTOMOTIVE TRANSMISSION LOCK

BACKGROUND OF THE INVENTION

The invention relates generally to automotive transmission locks and, more specifically, to a lock for automatic transmission vehicles which will prevent the transmission from being shifted out of "park."

Automatic transmission vehicles currently employ, as a part of the ignition lock system, a steering wheel lock which prevents the steering wheel of the vehicle from movement unless the ignition key is in place and the lock appropriately rotated. This safety feature also acts to lock the transmission in the "park" position so that the gearshift lever cannot be accidentally moved into a drive gear, thereby preventing an uncontrolled vehicle from moving. These locks only work when the ignition is in the "off" position and the key has been removed from the ignition switch.

Circumstances exist, however, which would make it advantageous to lock the transmission in the "park" position while the engine of the vehicle is running. For example, certain types of pneumatic jacks operate off of the exhausts of a running vehicle. If the driver of the vehicle is outside of the vehicle during this operation, it would be possible for the transmission of the vehicle to be moved out of the "park" position accidentally either by a child occupant or by a pet. Other circumstances where similar dangers or hazards could result would include when the vehicle was being used to assist in the starting of another vehicle. In such a situation, the assisting vehicle must be running throughout the procedure, and accidental displacement of the transmission out of the "park" position could easily cause injury to the operator or other nearby persons.

SUMMARY OF THE INVENTION

A lock for automatic transmissions of vehicles is provided which will prevent the transmission of the vehicle from being shifted out of the "park" position while the vehicle is running. A sleeve or collar is received about a steering column of the vehicle. Mounted on the sleeve is a gearshift lever which can be selectively manipulated to shift the gears of the automatic transmission. As the gearshift lever is manipulated, the sleeve or collar rotates about a central shaft of the steering column. A lock, including a rotatable lock cylinder, is mounted near the gearshift lever in the outer casing of the steering column. The lock extends inwardly and adjacent the sleeve or collar. A flange or ear extends radially from the lock cylinder and can be rotated between a free and locked position only by the aid of a key which will operate the lock. The sleeve or collar includes a receiving slot which, when the gearshift lever is moved to the "park" position, is adjacent the extended ear or flange of the lock. The ear of flange can thus be rotated into the slot by the key to the lock thereby preventing accidental manipulation of the gearshift lever out of the "park" position.

BRIEF DESCRIPTION OF THE DRAWINGS

FIG. 1 is a perspective view of a steering column of a vehicle including an automatic transmission lock of this invention;

FIG. 2 is a side elevational view of the steering column with parts cut away to reveal the collar mounted to the gearshift lever;

FIG. 3 is an enlarged cross-sectional perspective view showing the lock adjacent a receiving slot in the collar;

FIG. 4 is a top plan view of the transmission shift lever associated with a second perferred embodiment; and FIG. 5 is a sectional view of the transmission shift lever and lock cylinder.

DETAILED DESRIPTION OF A PREFERRED EMBODIMENT

A steering column, illustrated in FIG. 1 at 10, of a vehicle (not shown) includes a steering wheel 12, and ignition switch lock 14, a gear shift lever 16, and an automatic transmission lock 18 of the present invention. The steering column 10 is illustrated with parts removed in FIG. 2. The gear shift lever 16 is attached to a gear shift collar 20 which is received for pivotal movement about a steering post 22. The steering wheel 12 (FIG. 1) is connected to the steering post 22 and the combination acts in the conventional manner to direct the vehicle.

Movement of the gear shift lever 16 pivots the gear shift collar 20, which is operatively connected to an automatic transmission (not shown) of the vehicle. Selective movement of the gear shift lever 16 results thereby in corresponding adjustment in the conventional manner of the condition of the automatic transmission. The ignition switch lock 14 can be pivoted by an appropriate key to start the vehicle only if the gear shift lever 16 (and likewise the automatic transmission) is in the "Park" or "Neutral" position. This is a safety feature which prevents starting of the vehicle while it is in a forward or reverse gear.

The gear shift collar 20 includes a lock slot 24, as shown in FIG. 3. The lock slot 24 is at its vertical or top-most position when the gear shift lever 16 and collar 20 place the automatic transmission in the "Park" position. Above the lock slot 24 of the collar 20, is the transmission lock 18 which is mounted transversely of the collar 20 in the steering column 10. The lock 18 includes a radially extended ear 26 which pivots together with pivotal movement of the lock 18.

The relative size and position of the lock slot 24 and the ear 26 permit insertion of the ear 26 into the slot 24. Insertion can occur only when the shift lever 16 and collar 20 place the automatic transmission in the "Park" position where the slot 24 is at its top-most position directly below the ear 26. Only in the "Park" position, therefore, can the lock 18 be pivoted into the slot 24 by use of an appropriate key. When inserted into the slot 24, as shown by the broken lines in FIG. 3, the collar 20 cannot be pivoted by a gear shift lever 16. The auto transmission is then locked into the "Park" position and cannot be shifted into a forward or reverse gear by accidental or intentional movement of the shift lever 16.

The second preferred embodiment of the invention is illustrated in FIGS. 4 and 5, and includes a consolemounted automatic transmission control, indicated generally at 30. The control 30 includes a box 32 which has a slot in its upper surface through which a gear shift lever 34 extends. The condition of the automatic transmission of the vehicle is controlled by the gear shift lever 34 in the conventional manner. When the gear shift lever 34 is in the far forward position in the slot, at the position designated by the letter "P" in the Figure, the automatic transmission is in the locked-out or "Parked" position.

Mounted in the top of the box 32 adjacent the forward end of the slot is a lock cylinder 36, which includes a radially extended ear 38. When the gear shift lever 34 is in the "Parked" position, a mating key can be used to rotate the locked cylinder 36, and consequently the extended ear 38, so that the ear 38 extends across the slot rearwardly of the gear shift lever 34. The ear 38, in this locked or obstructing position, thus prevents the gear shift lever 34 from being moved out of the "Parked" position so that the vehicle cannot be accidentally or intentionally put into a forward or reverse gear.

Although the invention has been described through a preferred embodiment, the scope of the invention is not to be limited thereby. The lock slot, for instance, can be replaced by a raised ridge with a receiving indentation into which the lock ear can be inserted. Other similar changes can be made in the specific structure of the invention without departing from the scope as defined in the following claims

I claim:

1. In a vehicle having a gear shift lever mounted for pivotal movement about a steering column and an automatic transmission with a locked-out position, a transmission lock comprising:
   (a) a pivotable lock cylinder pivotable between a first, free position and a second, locked position only by a mating key inserted into said lock cylinder;
   (b) a radially extended ear mounted on said lock cylinder for pivotable movement between said first, free position and said second, locked position;
   (c) a collar member pivotable about the steering column by movement of the gear shift lever into and out of the locked-out position of the automatic transmission;
   (d) an ear-receiving slot oriented parallel to the plane of pivotal movement of said ear member;
   (e) a plurality of positions of said collar member corresponding to a plurality of positions of the gear shift lever, wherein one of said positions of said collar member, corresponding to the locked-out position of the automatic transmission, aligns said slot in the plane of pivotal movement of said ear member; and
   (f) wherein said ear member is rotated by said mating key between said first, free position therefor to said second, locked position therefor within said ear-receiving slot to prevent the gear shift lever from moving the transmission out of the locked-out position therefor.

2. The transmission lock as defined in claim 1, wherein:
   (a) said slot has substantially radial side walls which engage said ear member in the second, locked position therefor.

* * * * *